United States Patent
Iwata

(10) Patent No.: US 10,417,040 B2
(45) Date of Patent: Sep. 17, 2019

(54) JOB SCHEDULER TEST PROGRAM, JOB SCHEDULER TEST METHOD, AND INFORMATION PROCESSING APPARATUS

(71) Applicant: FUJITSU LIMITED, Kawasaki-shi, Kanagawa (JP)

(72) Inventor: Akitaka Iwata, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 15/639,187

(22) Filed: Jun. 30, 2017

(65) Prior Publication Data

US 2018/0011734 A1 Jan. 11, 2018

(30) Foreign Application Priority Data

Jul. 7, 2016 (JP) .................................. 2016-135042

(51) Int. Cl.

| G06F 9/46 | (2006.01) |
|---|---|
| G06F 9/48 | (2006.01) |
| G06F 9/38 | (2018.01) |
| G06F 11/36 | (2006.01) |
| G06F 9/50 | (2006.01) |
| G06Q 10/06 | (2012.01) |

(52) U.S. Cl.
CPC .......... *G06F 9/4843* (2013.01); *G06F 9/3851* (2013.01); *G06F 9/4881* (2013.01); *G06F 11/36* (2013.01); *G06F 11/3672* (2013.01); *G06F 9/5038* (2013.01); *G06Q 10/06313* (2013.01)

(58) Field of Classification Search
CPC .. G06F 9/4843; G06F 11/3672; G06F 9/4881; G06F 9/3851; G06F 11/36; G06F 9/5038; Y04S 10/54; G06Q 10/06313
See application file for complete search history.

(56) References Cited

U.S. PATENT DOCUMENTS

| 6,751,583 B1 * | 6/2004 | Clarke ................ G06F 17/5022 703/17 |
|---|---|---|
| 8,667,494 B1 * | 3/2014 | Riordan ................ G06F 9/5011 718/104 |
| 2001/0047382 A1 * | 11/2001 | Sachedina ................ G06F 9/52 718/104 |
| 2002/0069044 A1 * | 6/2002 | Berg ...................... G05B 17/02 703/22 |
| 2002/0143592 A1 * | 10/2002 | Nishikawa ............. G06Q 10/06 705/7.14 |
| 2006/0161920 A1 * | 7/2006 | An .......................... G06F 9/485 718/102 |
| 2008/0052716 A1 * | 2/2008 | Theurer ................ G06F 9/4856 718/103 |

(Continued)

FOREIGN PATENT DOCUMENTS

| JP | 4-268906 | 9/1992 |
|---|---|---|
| JP | 200-267889 | 9/2000 |

*Primary Examiner* — Adam Lee

(74) *Attorney, Agent, or Firm* — Staas & Halsey LLP

(57) ABSTRACT

For each thread of a job scheduler that is executing a test, whether or not a state of each thread is a standby state is determined. In a case where the state of every thread is the standby state, a system time referenced by each thread of the job scheduler is changed to a time later than the system. This causes each thread of the job scheduler to reference the changed system time and execute a process corresponding to the changed system time.

10 Claims, 26 Drawing Sheets

(56) References Cited

U.S. PATENT DOCUMENTS

| | | | | |
|---|---|---|---|---|
| 2008/0155549 A1* | 6/2008 | Blinick | ................... | G06F 9/485 |
| | | | | 718/103 |
| 2008/0307248 A1* | 12/2008 | Amano | .................... | G06F 1/08 |
| | | | | 713/600 |
| 2009/0007123 A1* | 1/2009 | Sreedharan | ........... | G06F 9/4887 |
| | | | | 718/103 |
| 2011/0055479 A1* | 3/2011 | West | .................... | G06F 9/4881 |
| | | | | 711/118 |
| 2011/0179417 A1* | 7/2011 | Inakoshi | ............ | G06F 9/45558 |
| | | | | 718/1 |
| 2011/0307236 A1* | 12/2011 | Ishii | .................... | G06F 9/45504 |
| | | | | 703/20 |
| 2015/0234677 A1* | 8/2015 | Bartley | ............... | G06F 11/3466 |
| | | | | 718/102 |
| 2015/0234680 A1* | 8/2015 | Konishi | ............... | H04W 24/08 |
| | | | | 718/102 |
| 2017/0024258 A1* | 1/2017 | Reid | .................... | G06F 9/5038 |

\* cited by examiner

FIG. 15

NEXT PROCESS TIME INFORMATION 131

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 12:15 | 12:10 | 12:20 | 12:15 | 12:10 | 12:15 | — | — |

FIG. 16

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 1 | 1 | 1 | 1 | 1 | 1 | 1 | 1 |

FIG. 17

PROCESS FREQUENCY INFORMATION 133

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 2 | 4 | 1 | 7 | 5 | 11 | 9 | 3 |

FIG. 18

ACCELERATION TIME INFORMATION 132

| ACCELERATION TIME |
|---|
| 20:30:00 |

FIG. 19

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 2 | 2 | 1 | 1 | 1 | 1 | 2 | 2 |

FIG. 20

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 2 | 2 | 2 | 2 | 2 | 2 | 2 | 2 |

FIG. 21

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 0 | 0 | 0 | 0 | 0 | 0 | 0 | 0 |

FIG. 22

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 1 | 1 | 0 | 0 | 0 | 0 | 0 | 0 |

FIG. 23

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 0 | 1 | 0 | 0 | 0 | 0 | 0 | 0 |

FIG. 24

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 1 | 0 | 0 | 0 | 0 | 0 | 0 | 0 |

FIG. 25

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 2 | 1 | 0 | 0 | 0 | 0 | 0 | 0 |

FIG. 26

SEMAPHORE INFORMATION 134

| MANAGER (1) | MANAGER (2) | SCHEDULER (1) | SCHEDULER (2) | SCHEDULER (3) | SCHEDULER (4) | SIMULATOR (1) | SIMULATOR (2) |
|---|---|---|---|---|---|---|---|
| 2 | 2 | 0 | 0 | 0 | 0 | 0 | 0 |

JOB SCHEDULER TEST PROGRAM, JOB SCHEDULER TEST METHOD, AND INFORMATION PROCESSING APPARATUS

CROSS-REFERENCE TO RELATED APPLICATION

This application is based upon and claims the benefit of priority of the prior Japanese Patent Application No. 2016-135042, filed on Jul. 7, 2016, the entire contents of which are incorporated herein by reference.

FIELD

The present invention relates to a job scheduler test program, a job scheduler test method, and an information processing apparatus.

BACKGROUND

A business operator that provides a service to a user (hereinafter also referred to as a business operator simply) constitutes and operates, e.g., business systems that correspond to different uses in order to provide various services to the user. In the above business system, the business operator operates, e.g., a job scheduler that determines a computation node that performs processing of each job and the timing of processing of each job.

Specifically, for example, the job scheduler grasps the status of available resources in each computation node, determines the computation node capable of processing a submitted job, and instructs the determined computation node to process the job. With this, even in the case where a plurality of the jobs need to be processed, it becomes possible for the business operator to efficiently perform the processing of the individual jobs (see, e.g., Japanese Laid-open Patent Publication No. 2000-267889 and Japanese Laid-open Patent Publication No. H4-268906).

SUMMARY

In the case where the above-described job scheduler is used, the business operator needs to perform a test of the operation of the job scheduler in advance. However, for example, in the case of the job scheduler that operates in a large-scale parallel computer system (hereinafter also referred to as a high performance computing (HPC) system), there are cases where it is difficult to perform the test by actually operating the HPC system.

To cope with this, when the business operator performs the test of the job scheduler, the business operator uses, e.g., a simulator that simulates the situation of the processing of the job or the like in the computation node constituting the HPC system. The simulator performs the simulation of the situation after the job is processed without actually processing the job in the computation node. With this, it becomes possible for the business operator to perform the test of the job scheduler without actually operating the computation node (hereinafter the execution of the simulation of the situation after the job is processed by the simulator is also referred to as acceleration of processing).

In the case where the acceleration of processing is performed as described above, the business operator needs to put the time of the system referenced by the job scheduler forward by the amount of time needed to actually process the accelerated job in order to perform the test of the job scheduler in the same situation as that in the case where the simulator is not used.

However, in this case, in order to prevent a process in the job scheduler from being influenced, the business operator needs to perform the acceleration of processing during a time period in which the job scheduler does not perform the process. Accordingly, in the case where it is not possible to determine a timing at which the job scheduler performs the process, it is not possible for the business operator to put the time of the system forward. Consequently, in this case, it is not possible for the business operator to perform the acceleration of processing and efficiently perform the test of the job scheduler.

A non-transitory computer-readable storage medium storing therein a job scheduler test program that causes a computer to execute a process includes: determining whether or not a state of every thread of a test-target job scheduler is a standby state; and changing a time of a system referenced when the thread executes a process to a time that is put forward in a case where the state of every thread is the standby state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a view illustrating the specific example of the next process time information 131.

FIG. 16 illustrates a specific example of the semaphore information 134.

FIG. 17 illustrates the specific example of the process frequency information 133.

FIG. 18 is a view illustrating the specific example of the acceleration time information 132.

FIG. 19 illustrates a specific example of the semaphore information 134.

FIG. 20 illustrates a specific example of the semaphore information 134.

FIG. 21 illustrates a specific example of the semaphore information 134.

FIG. 22 illustrates a specific example of the semaphore information 134.

FIG. 23 illustrates a specific example of the semaphore information 134.

FIG. 24 illustrates a specific example of the semaphore information 134.

FIG. 25 illustrates a specific example of the semaphore information 134.

FIG. 26 illustrates a specific example of the semaphore information 134.

DESCRIPTION OF EMBODIMENTS

[Configuration of Information Processing System]

Figure 1:
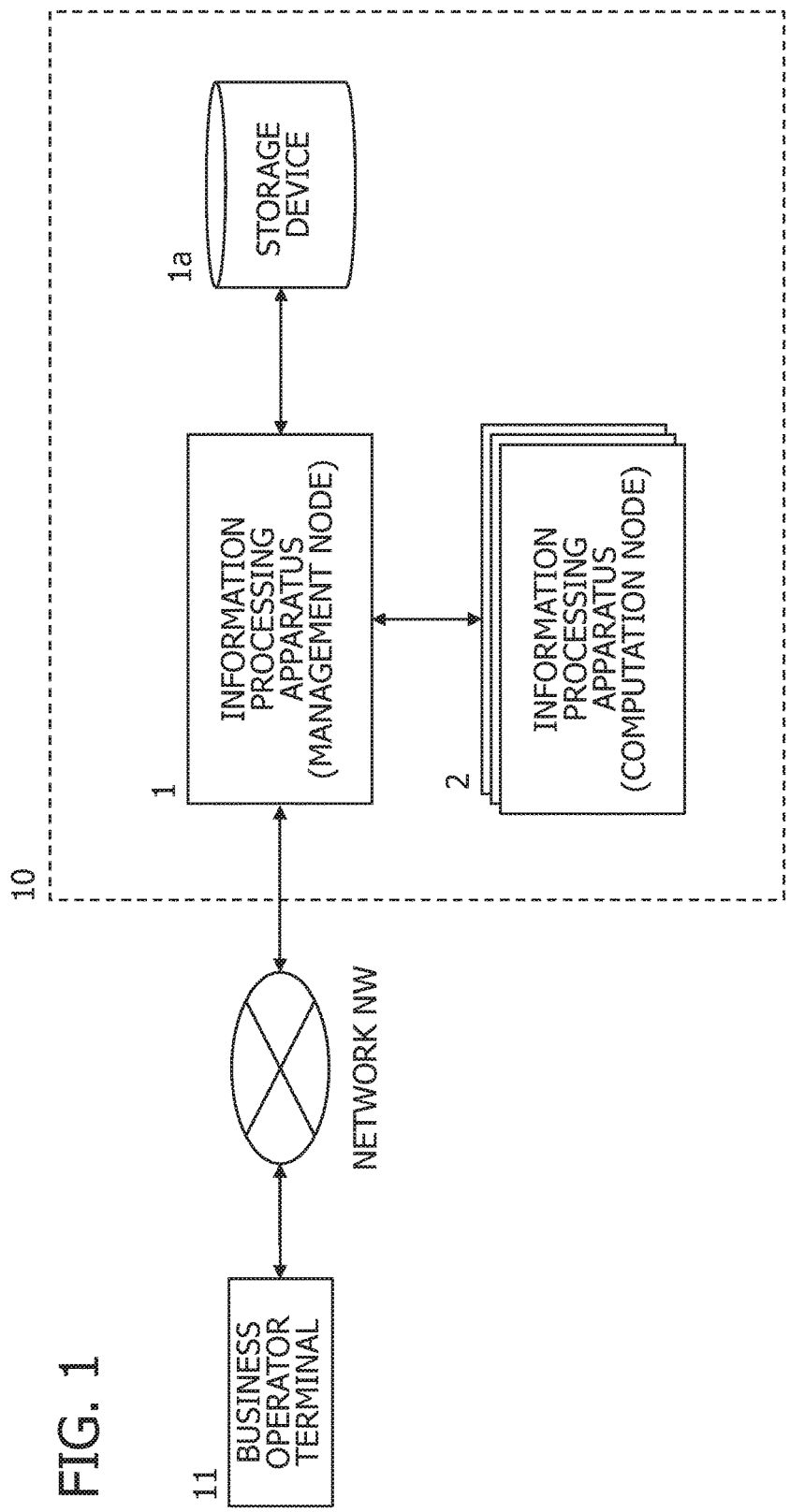
FIG. 1 is a view illustrating the configuration of an information processing system 10.

FIG. 1 is a view illustrating the configuration of an information processing system 10. The information processing system 10 illustrated in FIG. 1 has an information processing apparatus 1 (hereinafter also referred to as a job scheduler test device 1), an information processing apparatus 2, and a storage device 1a. The information processing apparatus 1 is a physical machine capable of accessing a business operator terminal 11 via a network NW configured by the Internet, an intranet or the like.

The information processing apparatus 1 is, e.g., a physical machine that functions as a management node in which a job scheduler operates. The information processing apparatus 1 performs a process of testing the operation of the job scheduler (hereinafter referred to as a job scheduler test process). Note that the physical machine in which the job scheduler operates may be the physical machine different from the physical machine that performs the job scheduler test process.

The information processing apparatus 2 is constituted by a plurality of physical machines, and each physical machine is a computation node that constitutes part of an HPC system.

The storage device 1a is an external disk device constituted by, e.g., a hard disk drive (HDD) or a solid state drive (SSD). Specifically, the storage device 1a stores, e.g., various pieces of information that are referenced when the job scheduler test process is performed. Note that the storage device 1a may also be a disk device provided inside the information processing apparatus 1.

The business operator terminal 11 is a terminal with which a business operator performs, e.g., input of needed information. In the case where information is input by the business operator, the business operator terminal 11 transmits the input information to, e.g., the information processing apparatus 1.

[Specific Examples of Information Processing Apparatus]

Figure 2:
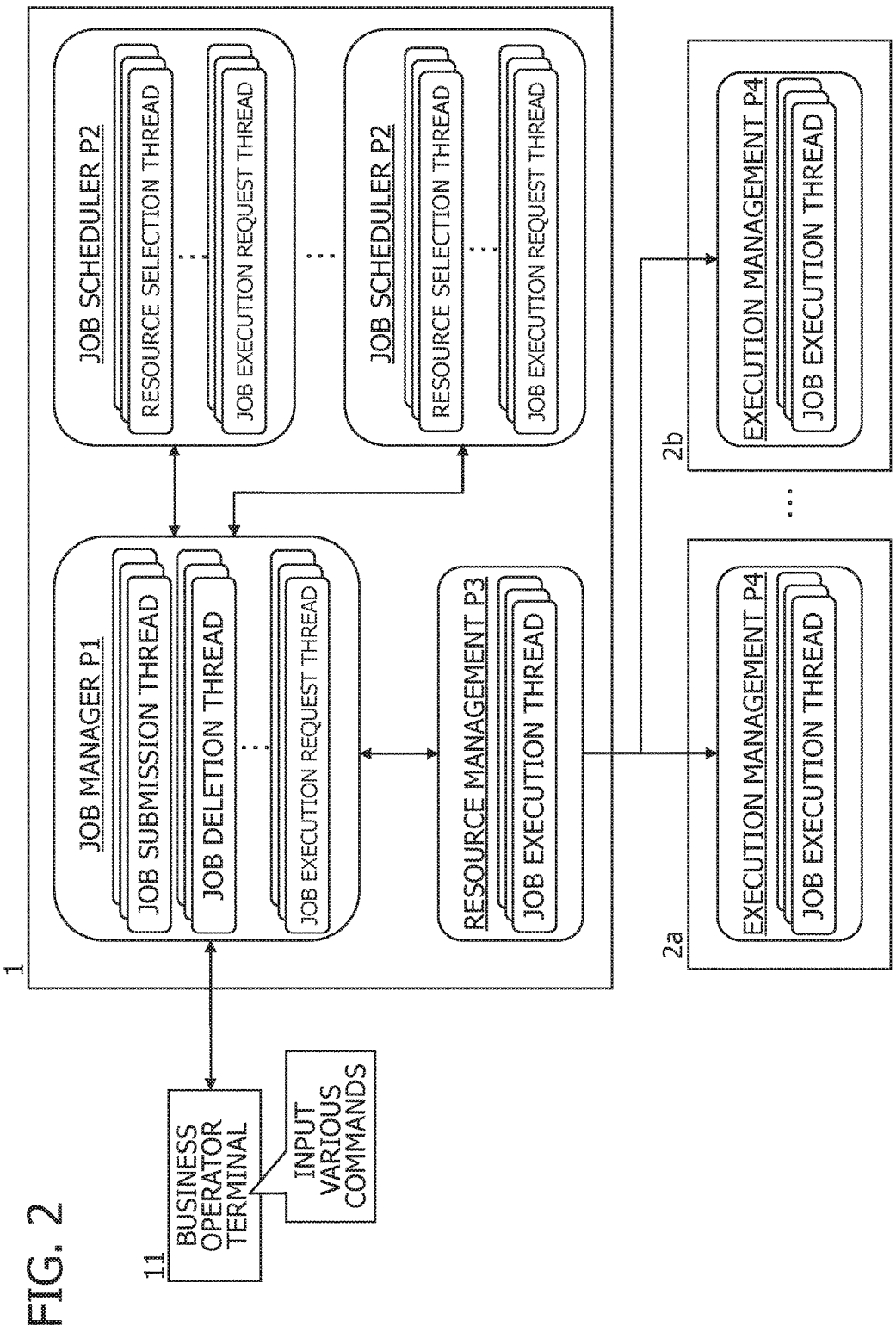
FIG. 2 is a view illustrating specific examples of the information processors 1 and 2.

Next, specific examples of the information processing apparatus 1 and 2 will be described. FIG. 2 is a view illustrating specific examples of the information processing apparatus 1 and 2.

In the information processing apparatus 1 illustrated in FIG. 2, a job manager process P1 that operates as a job manager managing the job scheduler (hereinafter also referred to as a job manager P1 simply) and a job scheduler process P2 that functions as the job scheduler (hereinafter also referred to as a job scheduler P2 simply) operate. In addition, in the information processing apparatus 1 illustrated in FIG. 2, a resource management process P3 that controls processing of jobs in the computation nodes (an information processing apparatus 2a and an information processing apparatus 2b in the example in FIG. 2) (hereinafter also referred to as a resource management P3 simply) and an execution management process P4 that performs the processing of the jobs in the computation nodes (hereinafter also referred to as an execution management P4 simply) operate. In the example illustrated in FIG. 2, each job scheduler P2 corresponds to any of the execution managements P4.

In the job manager P1 illustrated in FIG. 2, for example, a job submission thread that performs control of a submitted job, a job deletion thread that performs deletion of the submitted job, and a job execution request thread that makes a request for execution of the job to the resource management P3 operate. In addition, in the job scheduler P2 illustrated in FIG. 2, for example, a resource selection thread that selects the thread that is caused to execute the job from job execution threads of the execution management P4 and the job execution request thread that makes the request for execution of the job to the job manager P1 operate. Further, in the resource management P3 illustrated in FIG. 2, for example, the job execution thread that notifies the job execution thread of the execution management P4 of information needed for the execution of the job operates. Furthermore, in the execution management P4 illustrated in FIG. 2, for example, the job execution thread that performs the execution of the job operates.

In the information processing apparatus 1 illustrated in FIG. 2, for example, in the case where the test of the job manager P1 and the job scheduler P2 is performed, the business operator operates a job simulator instead of the resource management P3 and the execution management P4. Hereinbelow, a specific example of the information processing apparatus 1 in the case where the job simulator is used will be described. Note that, hereinafter the process and the thread are also simply referred to as threads collectively.

[Specific Example of Information Processing Apparatus in Case where Job Simulator is Used]

Figure 3:
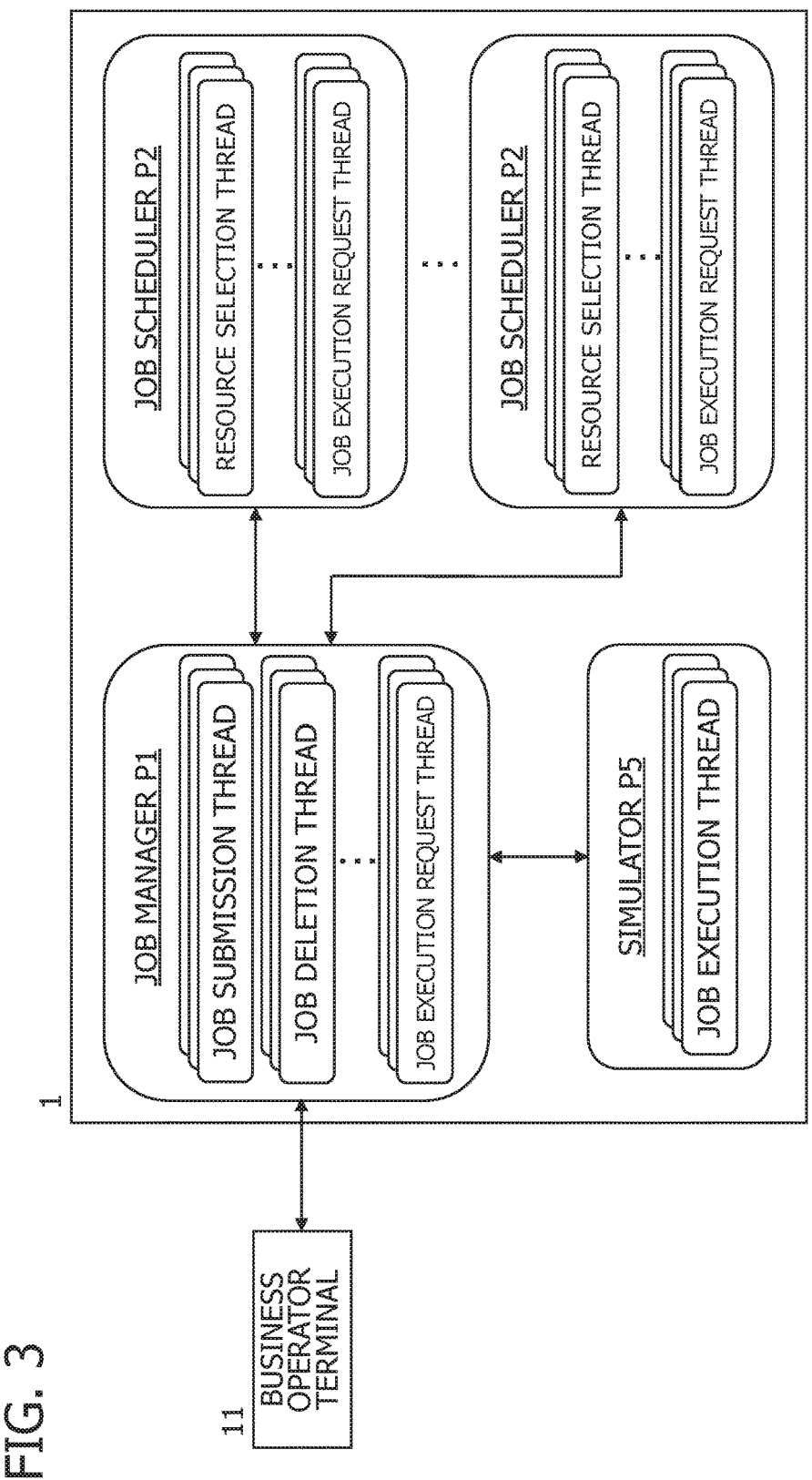
FIG. 3 is a view illustrating the specific example of the information processor 1 in the case where the job simulator is used.

FIG. 3 is a view illustrating the specific example of the information processing apparatus 1 in the case where the job simulator is used. In the case where the test of the job scheduler P2 or the like is performed, the information processing apparatus 1 illustrated in FIG. 3 operates a job simulator process P5 (hereinafter also referred to as a job simulator P5 simply) instead of the resource management P3 and the execution management P4 illustrated in FIG. 2. The job simulator P5 is a process capable of simulating, e.g., a situation after processing of the job or the like is performed in the computation node. Accordingly, it becomes possible for the business operator to perform the test related to the operation of the job scheduler without actually operating the computation node by operating the job simulator P5 in the information processing apparatus 1.

Herein, in the case where acceleration of processing is performed in the information processing apparatus 1, the business operator needs to put the time of the system referenced by the job scheduler P2 forward by the amount of time needed to actually process the accelerated job in order to perform the test of the job scheduler P2 in the same situation as that in the case where the simulator P5 is not used.

However, in this case, in order to prevent a process in the job scheduler P2 from being influenced, the business operator needs to perform the acceleration of processing during a time period in which the job scheduler P2 does not perform the process. Accordingly, in the case where it is not possible to determine a timing at which the job scheduler P2 performs the process, it is not possible for the business operator to put the time of the system forward. Consequently, in this case, it is not possible for the business operator to perform the acceleration of processing, and efficiently perform the test of the job scheduler P2.

To cope with this, in the present embodiment, the information processing apparatus 1 determines whether or not the state of every thread of the job scheduler P2 (hereinafter also referred to as a test-target job scheduler P2) is a standby state. Subsequently, in the case where the state of every thread of the job scheduler P2 is the standby state, the information processing apparatus 1 changes the time of the system referenced when each thread executes the process to the time that is put forward. Hereinbelow, the outline of the job scheduler test process in the present embodiment will be described.

[Outline of Job Scheduler Test Process]

Figure 4:
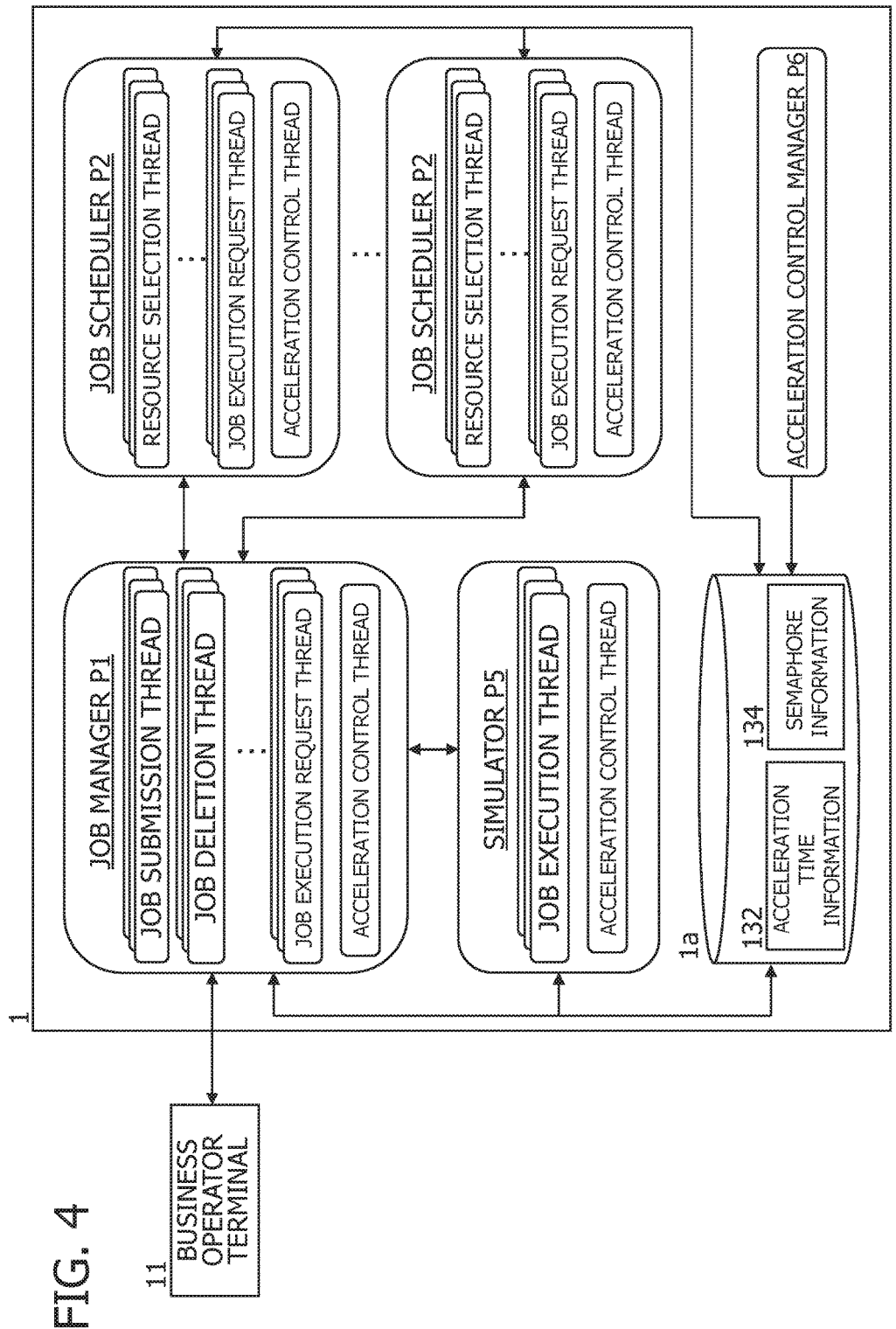
FIG. 4 is a view illustrating the outline of the job scheduler test process in the present embodiment.

FIG. 4 is a view illustrating the outline of the job scheduler test process in the present embodiment. In an example illustrated in FIG. 4, in the information processing apparatus 1, an acceleration control manager process P6 (hereinafter also referred to as an acceleration control manager P6 simply) operates. In addition, in the example illustrated in FIG. 4, an acceleration control thread operates in each of the job manager P1, the job scheduler P2, and the simulator P5.

Specifically, each thread that operates in the information processing apparatus 1 stores information indicative of whether or not the thread is performing the process (in the standby state or not) (hereinafter also referred to as semaphore information 134) in the storage device 1a. Subsequently, in the case where the semaphore information 134 indicates that every thread of the information processing apparatus 1 is in the standby state, the acceleration control manager P6 puts the time referenced by each thread that operates in the information processing apparatus 1 forward based on information (hereinafter also referred to as acceleration time information 132) indicative of the total of the amount of time resulting from execution of the acceleration of processing. Thereafter, the acceleration control thread causes each process to reference the acceleration time.

That is, in the case where the test of the job scheduler P2 is performed by using the job scheduler P5, when every thread of the job scheduler P2 is in the standby state, the test of the job scheduler P2 is not influenced even when the information processing apparatus 1 performs the acceleration of processing. Accordingly, the information processing apparatus 1 performs the acceleration of processing only in the case every thread of the job scheduler P2 is in the standby state. With this, it becomes possible for the information processing apparatus 1 to efficiently perform the test of the job scheduler P2 that uses the job simulator P5.

[Hardware Configuration of Information Processing Apparatus]

Figure 5:
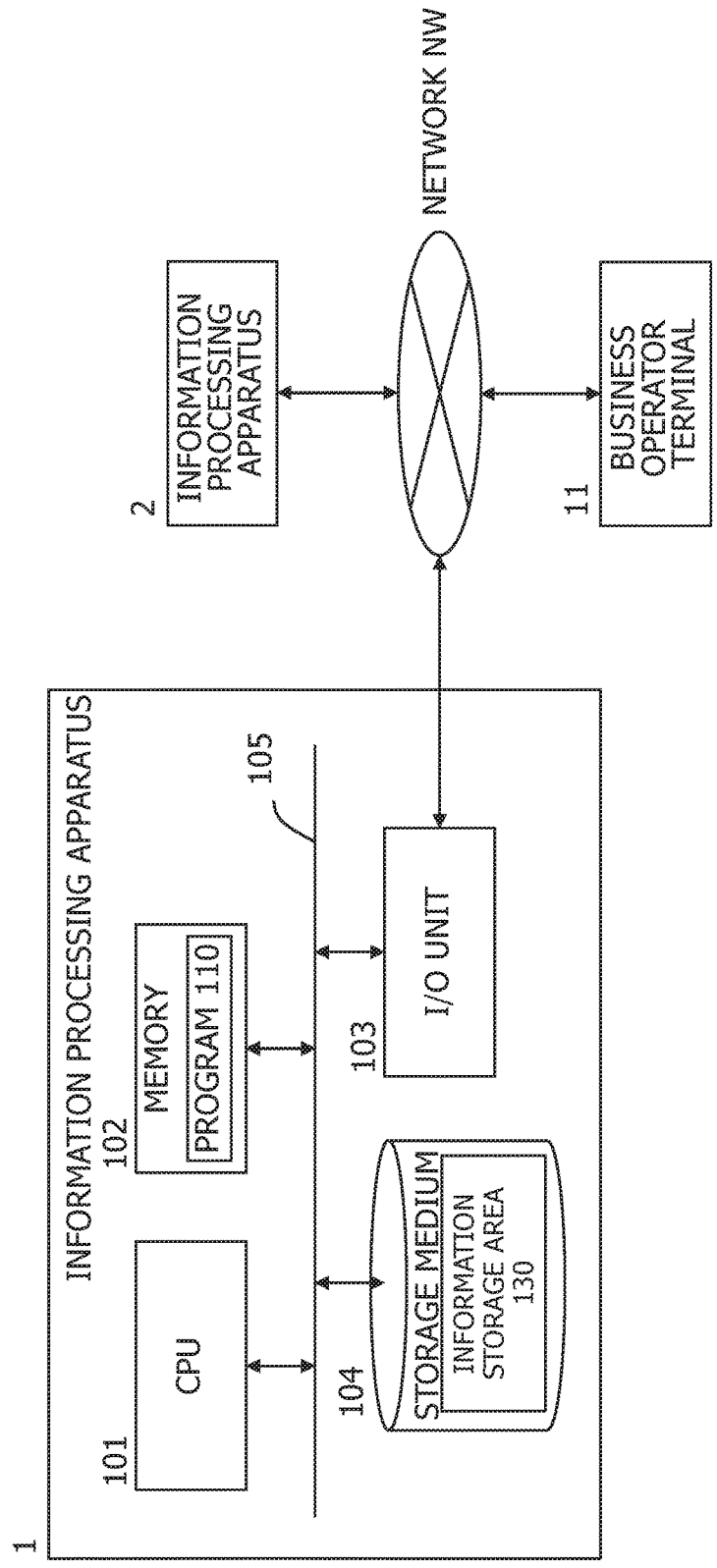
FIG. 5 is a view illustrating the hardware configuration of the information processor 1.

Next, the hardware configuration of the information processing apparatus 1 will be described. FIG. 5 is a view illustrating the hardware configuration of the information processing apparatus 1.

The information processing apparatus 1 has a CPU 101 as a processor, a memory 102, an external interface (I/O unit) 103, and a storage medium (storage) 104. The individual units are connected to each other via a bus 105.

The storage medium 104 stores a program 110 for performing the job scheduler test process in a program storage area (not illustrated) in the storage medium 104.

As illustrated in FIG. 5, the CPU 101 loads the program 110 into the memory 102 from the storage medium 104 at the time of execution of the program 110, and performs the job scheduler test process in cooperation with the program 110. That is, the CPU 101 cooperates with the program 110 to thereby operate as the acceleration control thread or the acceleration control manager P6 described later.

The storage medium 104 has an information storage area 130 (hereinafter also referred to as a storage unit 130) in which information referenced when, e.g., the job scheduler test process is performed is stored. Specifically, the information storage area 130 stores, e.g., information indicative of a time at which each thread in the standby state performs the process next (hereinafter also referred to as next process time information 131) and the acceleration time information 132. In addition, the information storage area 130 stores, e.g., information indicative of the number of times of changing of the state of each thread from the standby state to an execution state (hereinafter also referred to as process frequency information 133) and the semaphore information 134.

The external interface 103 performs communication with the business operator terminal 11 or the like. Note that the storage device 1a illustrated in FIG. 1 may correspond to the storage medium 104.

[Flowchart of Outline of First Embodiment]

Figure 6:
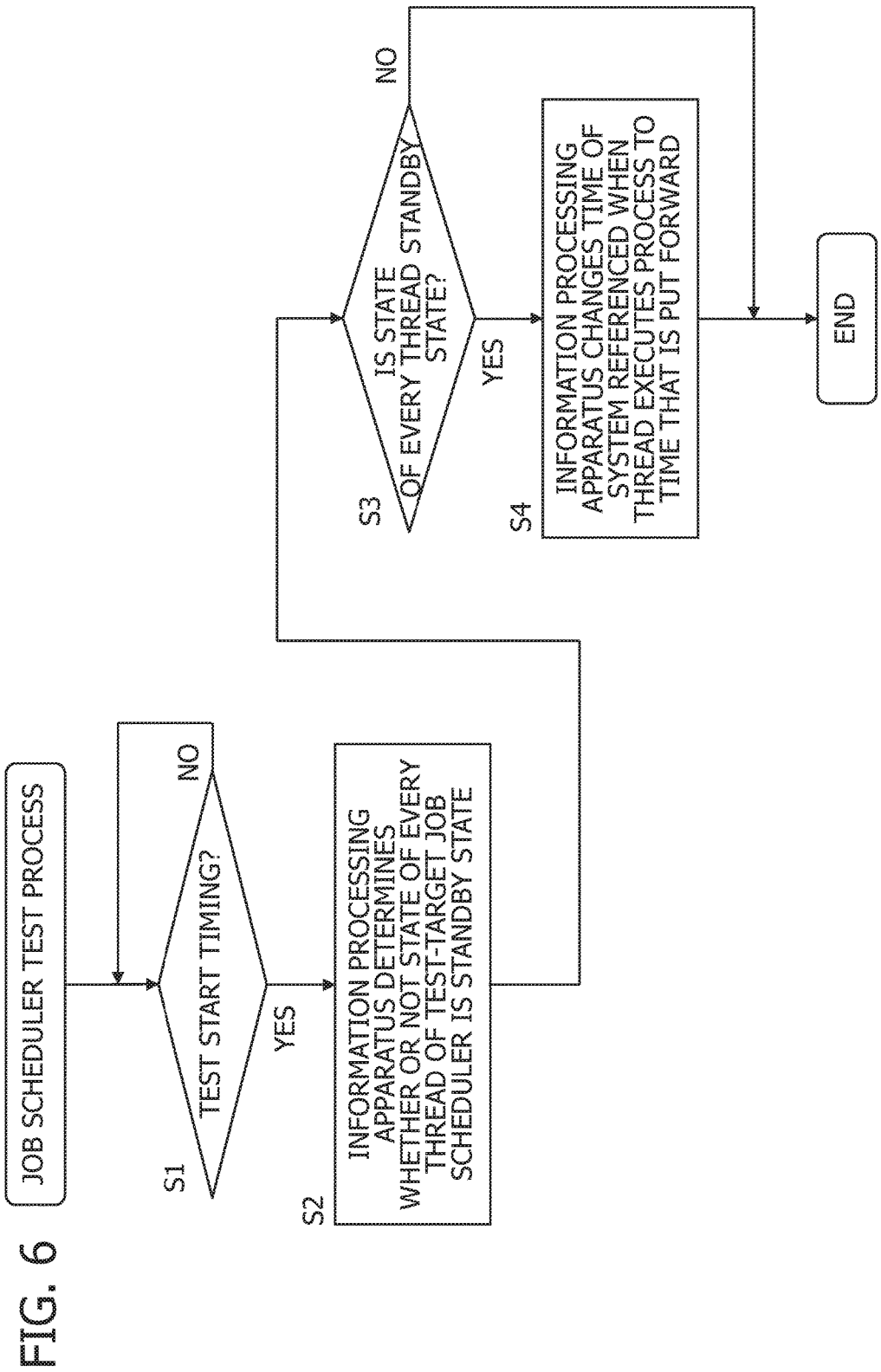
FIG. 6 is a flowchart illustrating the outline of the job scheduler test process in the first embodiment.

Next, a flowchart of an outline of a first embodiment will be described. FIG. 6 is a flowchart illustrating the outline of the job scheduler test process in the first embodiment.

The information processing apparatus 1 waits until a test start timing (NO in S1). The test start timing may be, e.g., a timing at which information that the test of the job scheduler P2 is executed is input to the information processing apparatus 1 by the business operator.

In the case where the test start timing has come (YES in S1), the information processing apparatus 1 determines whether or not the state of every thread of the test-target job scheduler P2 is the standby state (S2). The information processing apparatus 1 determines whether or not the state of every thread of the test-target job scheduler P2 is the standby state by referencing the semaphore information 134 stored in the information storage area 130. A specific example of the semaphore information 134 will be described later.

As a result, in the case where it is determined that the state of every thread of the test-target job scheduler P2 is the standby state (YES in S3), the information processing apparatus 1 changes the time of the system referenced when the thread executes the process to the time that is put forward (S4). On the other hand, in the case where it is determined that the thread of the test-target job scheduler P2 that is not in the standby state is present (NO in S3), the information processing apparatus 1 does not perform the process in S4.

That is, in the case where the test of the job scheduler P2 is performed by using the job simulator P5, in the case where every thread of the job scheduler P2 is in the standby state, even when the information processing apparatus 1 performs the acceleration of processing, the test of the job scheduler P2 is not influenced. Accordingly, the information processing apparatus 1 performs the acceleration of processing only in the case where every thread of the job scheduler P2 is in the standby state.

Thus, the information processing apparatus 1 in the present embodiment determines whether or not the state of every thread of the test-target job scheduler P2 is the standby state. In the case where the state of every thread of the job scheduler P2 is the standby state, the information processing apparatus 1 changes the time of the system referenced when each thread executes the process to the time that is put forward.

With this, it becomes possible for the information processing apparatus 1 to efficiently perform the test of the job scheduler that uses the job simulator.

[Details of First Embodiment]

Next, details of the first embodiment will be described. FIGS. 7 to 14 are flowcharts illustrating details of the job scheduler test process in the first embodiment. FIGS. 15 to 26 are views illustrating details of the job scheduler test process in the first embodiment. With reference to FIGS. 15 to 26, the flowcharts in FIGS. 7 to 14 will be described. Note that, hereinbelow, the case where the test targets are the job manager P1 and the job scheduler P2 will be described.

[Normal Process of Job Manager]

First, a process normally performed in the job manager P1 of the information processing apparatus 1 (hereinafter also referred to as a normal process) will be described.

Figure 7:
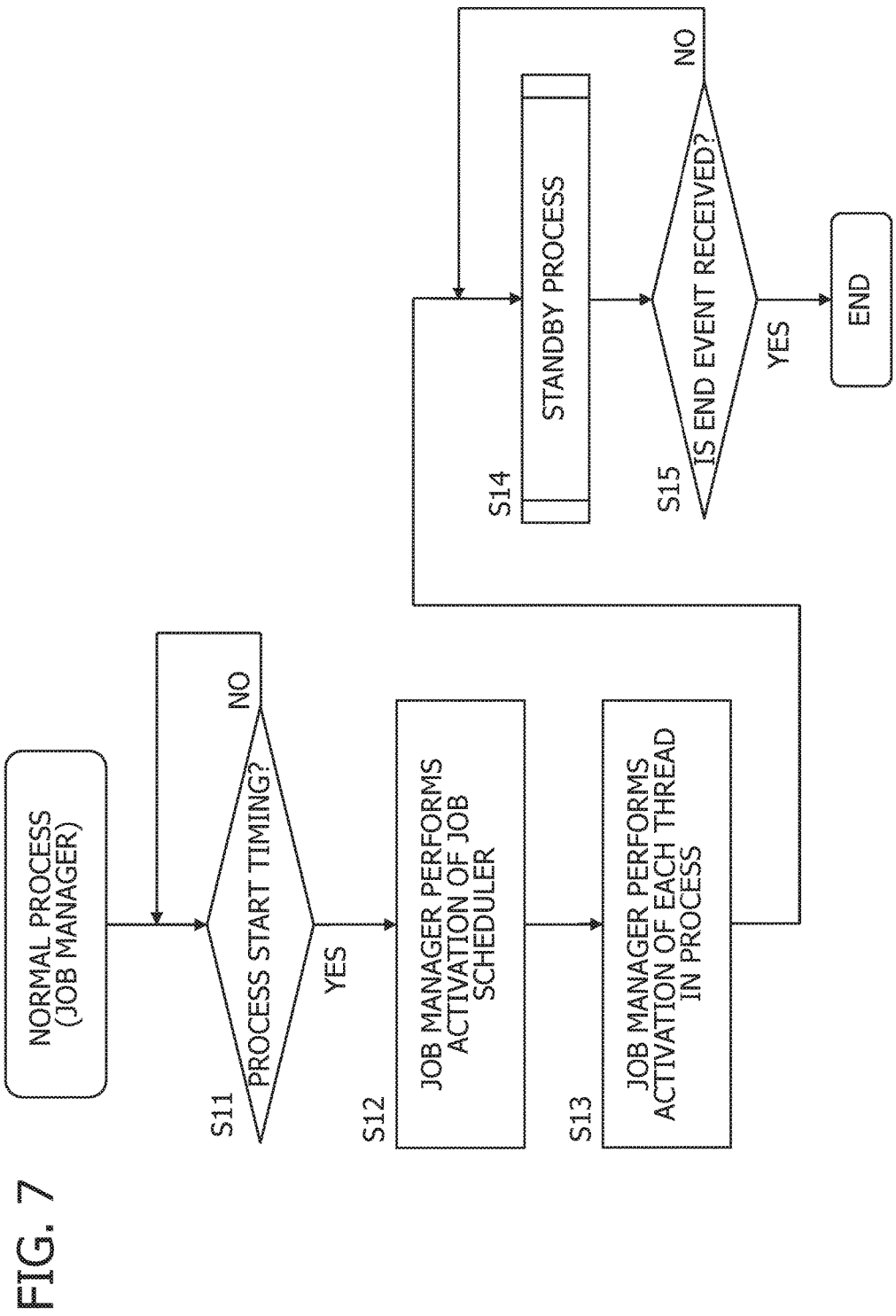
FIG. 7 is a flowchart illustrating details of the job scheduler test process in the first embodiment.

As illustrated in FIG. 7, the job manager P1 waits until a process start timing (NO in S11). The process start timing may be, e.g., a timing at which the job manager P1 activates the job scheduler P2 (a timing predetermined by the business operator).

In the case where the process start timing has come (YES in S11), the job manager P1 performs the activation of the job scheduler P2 (S12). Note that the business operator may also perform the activation of the job simulator P5 before the process start timing.

Subsequently, the job manager P1 performs the activation of each thread in the process (S13). Specifically, the job manager P1 activates, e.g., the job submission thread, the job deletion thread, and the job execution request thread.

Thereafter, the job manager P1 specifies a predetermined event and a predetermined time, and calls a standby process (S14). The standby process is a process in which the job manager P1 waits until reception of the specified predetermined event or the specified predetermined time. That is, after performing the processes up to S13, the job manager P1 waits until the timing at which the process is to be performed next. Hereinbelow, the standby process will be described.

[Standby Process]

Figure 14:
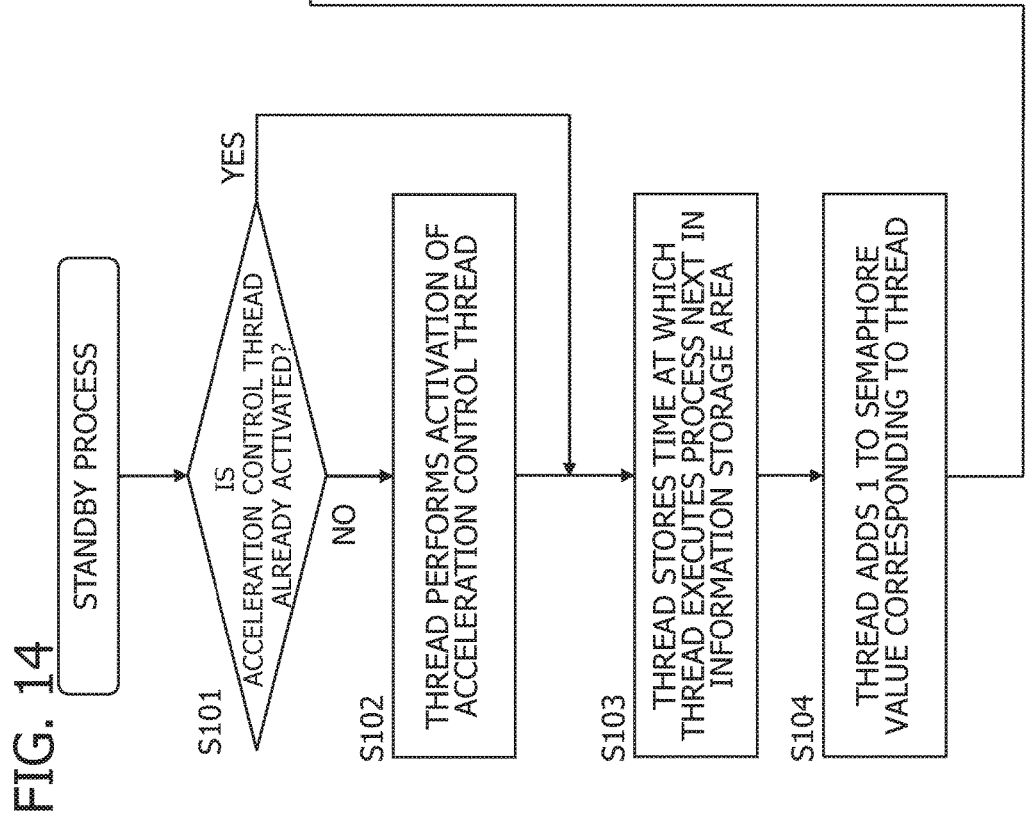
FIG. 14 is a flowchart illustrating details of the job scheduler test process in the first embodiment.

FIG. 14 is a flowchart illustrating the standby process. The thread that calls the standby process (hereinafter also referred to as the thread simply) determines whether or not the acceleration control thread is activated in the process in which the thread is included (S101). In the case where the acceleration control thread is not activated (NO in S101), the thread performs the activation of the acceleration control thread (S102). On the other hand, in the case where the acceleration control thread is activated (YES in S101), the thread does not perform the process in S102.

That is, the information processing apparatus 1 in the present embodiment performs the activation of the acceleration control thread in the standby process that is called first. With this, the business operator does not need to cause the job manager P1 or the job scheduler P2 serving as the test target to perform the process for activating the acceleration control thread (a process that is not performed normally). As a result, it becomes possible for the business operator to increase reliability of the test of the job manager P1 or the job scheduler P2.

Thereafter, the thread stores the time at which the thread executes the process next in the information storage area 130 as part of the next process time information 131 (S103). Specifically, the thread stores the predetermined time specified in the process in S14 in the information storage area 130 as part of the next process time information 131. Hereinbelow, a specific example of the next process time information 131 will be described.

[Specific Example of Next Process Time Information]

FIG. 15 is a view illustrating the specific example of the next process time information 131. Hereinbelow, the description will be given on the assumption that one job manager P1 having two threads, two job schedulers each having two threads, and one job simulator P5 having two threads operate in the information processing apparatus 1.

The next process time information 131 illustrated in FIG. 15 has, as items, "MANAGER (1)" and "MANAGER (2)" in which times corresponding to the threads of the job manager P1 are set. In addition, the next process time information 131 illustrated in FIG. 15 has, as items, "SCHEDULER (1)", "SCHEDULER (2)", "SCHEDULER (3)", and "SCHEDULER (4)" in which times corresponding to the threads of the individual job schedulers P2 are set. Further, the next process time information 131 illustrated in FIG. 15 has, as items, "SIMULATOR (1)" and "SIMULATOR (2)" in which times corresponding to the threads of the job simulator P5 are set.

Specifically, in the next process time information 131 illustrated in FIG. 15, "12:15" is set in "MANAGER (1)", and "12:10" is set in "MANAGER (2)". That is, the next process time information 131 illustrated in FIG. 15 indicates that the next process times of the threads of the job manager P1 are 12:15 and 12:10.

On the other hand, in the next process time information 131 illustrated in FIG. 15, "-" denoting that information is not set is set in each of "SIMULATOR (1)" and "SIMULATOR (2)". That is, the next process time information 131 illustrated in FIG. 15 indicates that the standby process is not performed in each thread included in the simulator P5. The description of the other pieces of information included in FIG. 15 will be omitted.

Returning to FIG. 14, the thread adds 1 to a value indicated by the semaphore information 134 (hereinafter also referred to as a semaphore value) corresponding to the thread (S104). Subsequently, the thread waits until the reception of the predetermined event, the predetermined time, or a notification is issued from the acceleration control thread (NO in S105). The predetermined event is the event that is preset in correspondence to each of the threads that perform the standby process. In addition, the predetermined time is the time that is preset in correspondence to each of the threads that perform the standby process. Specifically, the predetermined event may be reception of a job submission event transmitted by the business operator terminal 11 in response to input of a command for submitting a new job in the business operator terminal 11. Hereinbelow, a specific example of the semaphore information 134 will be described.

[Specific Example of Semaphore Information]

FIGS. 16 and 19 to 26 illustrate a specific example of the semaphore information 134. The semaphore information 134 illustrated in FIG. 16 and the like has the same items as those of the next process time information 131 illustrated in FIG. 15. Specifically, in the semaphore information 134 illustrated in FIG. 16, "1" is set in each item.

Returning to FIG. 14, in the case where the reception of the predetermined event or the like is performed (YES in S105), the thread subtracts 1 from the semaphore value corresponding to the thread (S106). That is, the thread performs control of the semaphore value such that the semaphore value corresponding to the thread is increased by 1 while the thread waits. With this, as will be described later, it becomes possible for the information processing apparatus 1 to determine whether or not every thread of the information processing apparatus 1 is in the standby state.

Subsequently, the thread adds 1 to the process frequency information 133 corresponding to the thread (S107). Thereafter, the thread ends the standby process. Hereinbelow, a specific example of the process frequency information 133 will be described.

[Specific Example of Process Frequency Information]

FIG. 17 illustrates the specific example of the process frequency information 133. The process frequency information 133 illustrated in FIG. 17 has the same items as those of the next process time information 131 illustrated in FIG. 15. Specifically, in the process frequency information 133 illustrated in FIG. 17, "2" is set in "MANAGER (1)", and "4" is set in "MANAGER (2)". That is, the process frequency information 133 illustrated in FIG. 17 indicates that the number of times of changing of the thread of the job manager P1 from the standby state to the execution state due to the reception of the predetermined event or the like is 2 in "MANAGER (1)" and is 4 in "MANAGER(2)". The description of the other pieces of information included in FIG. 17 will be omitted.

With this, as will be described later, it becomes possible for the information processing apparatus 1 to compare the process frequency information 133 before a predetermined comparison-target time period with the process frequency information 133 after the predetermined comparison-target time period to thereby determine whether or not the thread that is brought into the execution state is present during the comparison-target time period.

Returning to FIG. 7, for example, in the case where an end event is received in the standby process in S14 (YES in S15), the job manager P1 ends the normal process. On the other hand, in the case where the end event is not received in the standby process in S14 (NO in S15), the job manager P1 performs the processes in and after S14 again.

That is, the job manager P1 ends the normal process only in the case where the end event is received in the standby process in S14. Accordingly, for example, in the case where the standby process is ended due to coming of the predetermined time, the job manager P1 continues the job scheduler test process without ending it.

[Normal Process of Job Scheduler]

Figure 8:
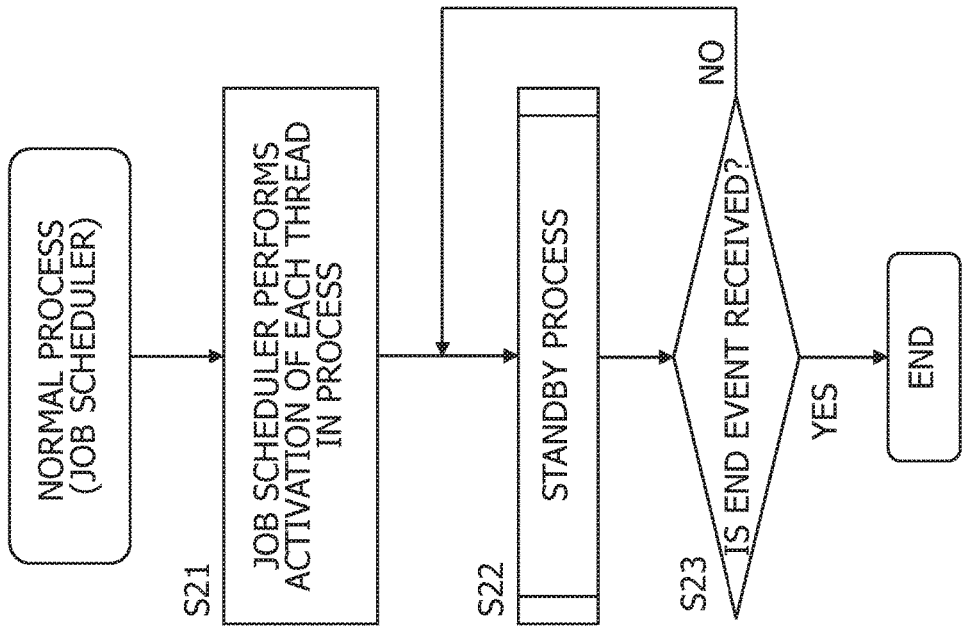
FIG. 8 is a flowchart illustrating details of the job scheduler test process in the first embodiment.

Next, a normal process in the job scheduler P2 of the information processing apparatus 1 will be described. As illustrated in FIG. 8, after the job scheduler P2 is activated by the job manager P1, the job scheduler P2 activates each thread in the process (S21). Specifically, the job scheduler P2 activates, e.g., the resource selection thread and the job execution request thread.

Thereafter, the job scheduler P2 calls the standby process illustrated in FIG. 7 (S22). Subsequently, for example, in the case where the standby process called in the process in S22 is ended due to the reception of the end event (YES in S23), the job scheduler P2 ends the normal process similarly to the case illustrated in FIG. 7. On the other hand, in the case where the standby process called in the process in S22 is ended without the reception of the end event (NO in S23), the job manager P1 performs the processes in and after S22 again.

[Normal Process of Job Submission Thread]

Figure 9:
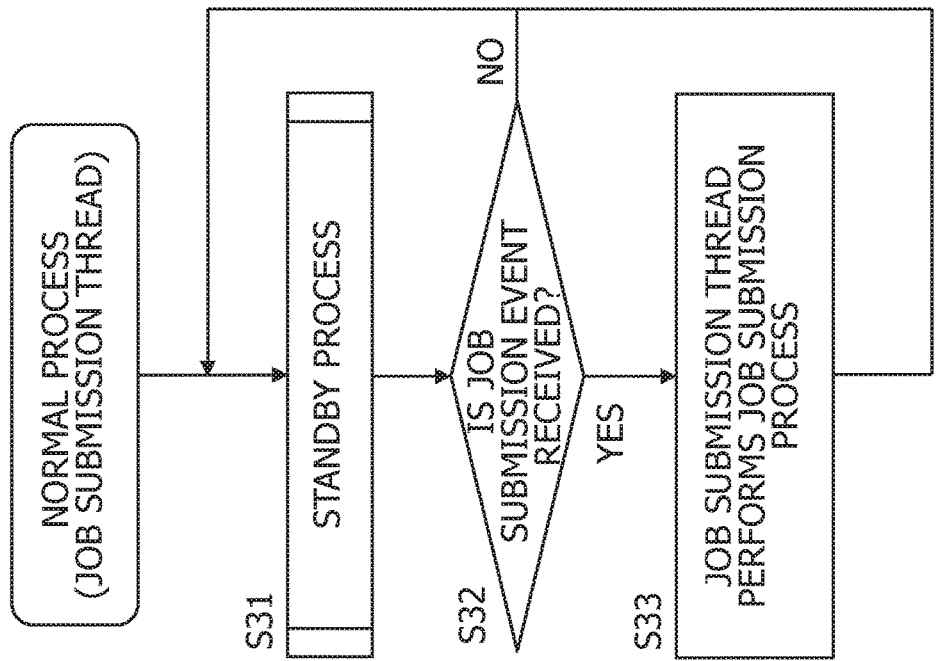
FIG. 9 is a flowchart illustrating details of the job scheduler test process in the first embodiment.

Next, a normal process in the job submission thread included in the job manager P1 of the information processing apparatus 1 will be described. As illustrated in FIG. 9, after the job submission thread is activated by the job manager P1, the job submission thread specifies the predetermined event and the predetermined time, and calls the standby process illustrated in FIG. 7 (S31).

Subsequently, in the case where the job submission event is received in the standby process in S31 (YES in S32), the job submission thread submits the job to the job manager P1 (S33). Thereafter the job submission thread ends the normal process. On the other hand, in the case where the job submission event is not received in the standby process in S31 (NO in S32), the job submission thread performs the processes in and after S31 again.

[Normal Process of Job Execution Thread]

Figure 10:
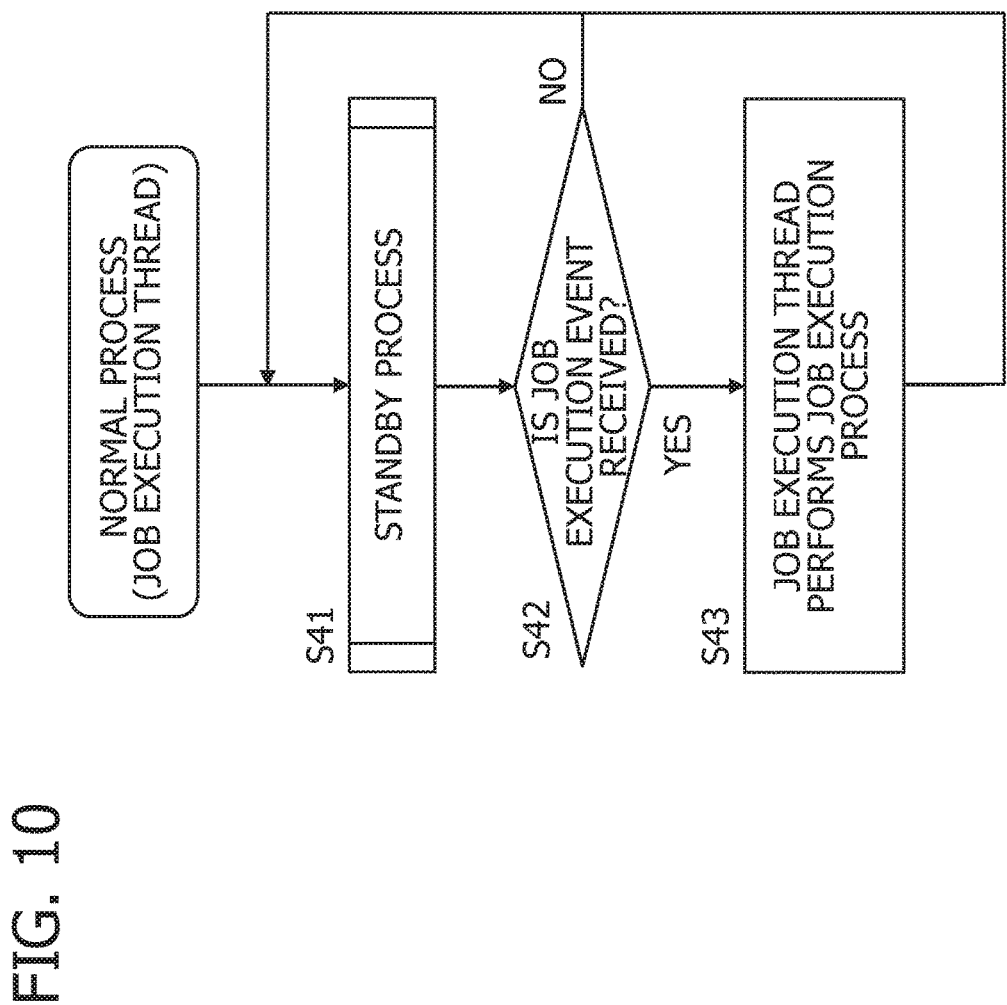
FIG. 10 is a flowchart illustrating details of the job scheduler test process in the first embodiment.

Next, a process performed in the job execution thread included in the job simulator P5 of the information processing apparatus 1, i.e., a process executed by the job simulator P5 instead of the resource management P3 and the execution management P4 (hereinafter also referred to as a normal process) will be described. As illustrated in FIG. 10, after the job execution thread is activated by the job manager P1, the job execution thread specifies the predetermined event and the predetermined time, and calls the standby process illustrated in FIG. 7 (S41).

Subsequently, for example, in the case where a job execution event is received in the standby process in S41 (YES in S42), the job execution thread executes the job (S43). Thereafter the job execution thread ends the normal process. On the other hand, in the case where the job execution event is not received in the standby process in S41 (NO in S42), the job execution thread performs the processes in and after S41 again.

[Job Scheduler Test Process of Acceleration Control Thread]

Next, the job scheduler test process in the acceleration control thread of the information processing apparatus 1 will be described. The acceleration control thread is the thread included in each process that operates in the information processing apparatus 1. Accordingly, the job scheduler test process of the acceleration control thread is performed in each process that operates in the information processing apparatus 1.

Figure 11:
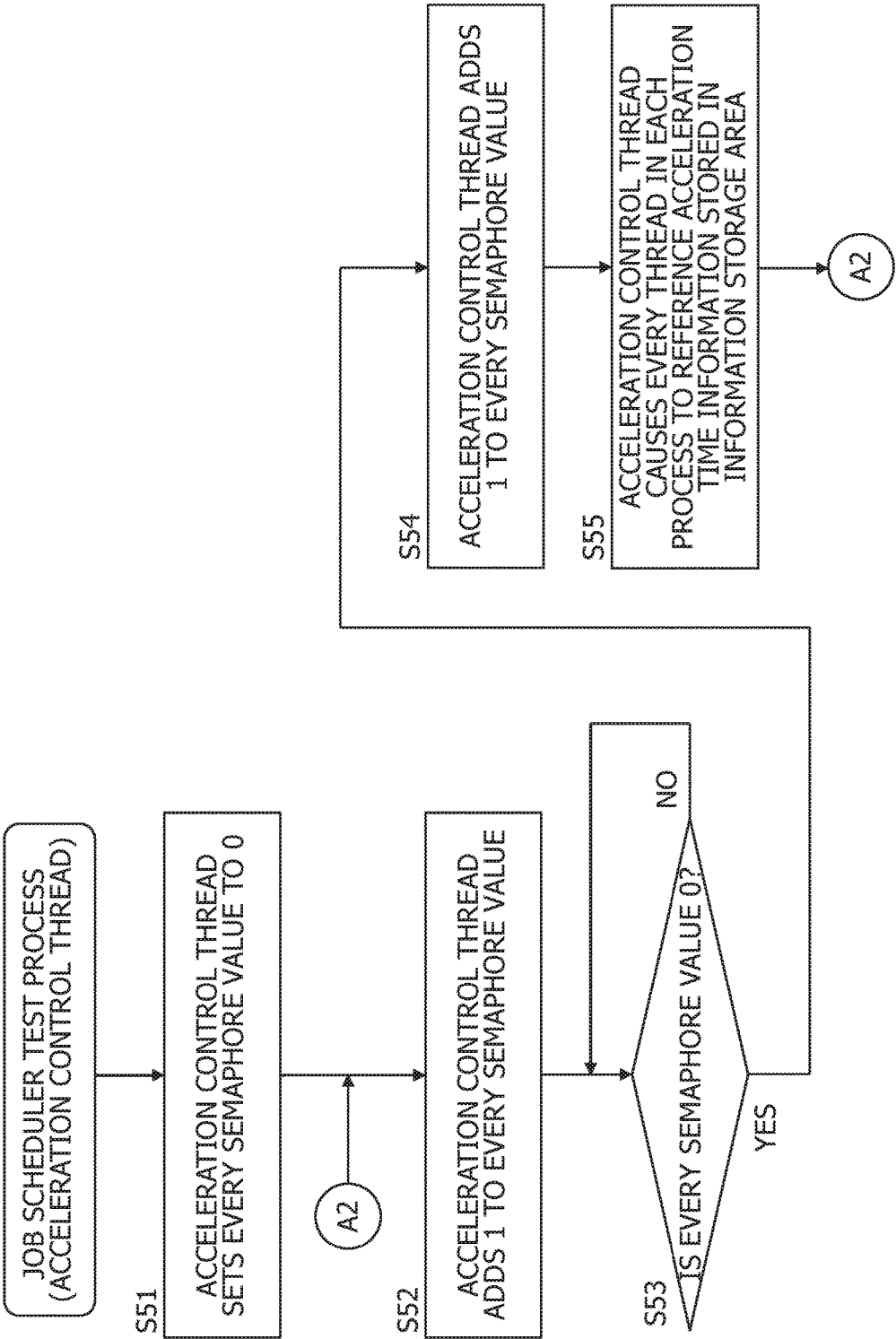
FIG. 11 is a flowchart illustrating details of the job scheduler test process in the first embodiment.

As illustrated in FIG. 11, after the acceleration control thread is activated by each process, the acceleration control thread sets the semaphore value corresponding to every thread included in the same process as that of the acceleration control thread to 0 (S51). Subsequently, the acceleration control thread adds 1 to the semaphore value corresponding to every thread included in the same process as that of the acceleration control thread (S52). Thereafter, the acceleration control thread waits until the semaphore value corresponding to every thread included in the same process as that of the acceleration control thread becomes 0 (NO in S53).

That is, as will be described later, in the case where every thread that operates in the information processing apparatus 1 is brought into the standby state, the acceleration control manager P6 sets the semaphore value corresponding to every thread that operates in the information processing apparatus 1 to 0. Accordingly, in the process in S53, the acceleration control thread waits until the acceleration control manager P6 sets the semaphore value corresponding to every thread that operates in the information processing apparatus 1 to 0.

Subsequently, in the case where the semaphore value corresponding to every thread included in the same process as that of the acceleration control thread becomes 0 (YES in S53), the acceleration control thread adds 1 to every semaphore value (S54).

Note that, in the case where the acceleration control thread adds 1 to every semaphore value in the process in S54, the acceleration control thread performs the addition to every semaphore value at the same time. With this, it becomes possible to prevent the state of the thread from being changed during the addition to the semaphore value.

Thereafter, the acceleration control thread causes every thread in each process to reference the acceleration time information 132 stored in the information storage area (S55). Subsequently, after the process in S55, the acceleration control thread performs the processes in and after S52 again.

That is, in the case where a timing at which the process of the test-target thread is not influenced even when the acceleration of processing is performed has come (YES in S53), the acceleration control thread causes each thread included in the same process as that of the acceleration control thread to reference the acceleration time information 132. With this, it becomes possible for the acceleration control thread to put the time referenced when each thread included in the same process as that of the acceleration control thread performs the process forward by the amount of time indicated by the acceleration time information 132.

Herein, in the case where the thread in the standby state is present at the timing at which the semaphore value corresponding to every thread that operates in the information processing apparatus 1 becomes 0, the thread does not reference the acceleration time information 132 until the thread is brought into the execution state. Accordingly, in the case where the semaphore value corresponding to every thread that operates in the information processing apparatus 1 becomes 0, the acceleration control thread transmits a notification for changing the state to the execution state to each thread included in the same process as that of the acceleration control thread.

With this, even in the case where the thread in the standby state is present at the timing at which the semaphore value corresponding to every thread that operates in the information processing apparatus 1 becomes 0, it becomes possible for the acceleration control thread to cause the present thread to reference the acceleration time information 132. Hereinbelow, a specific example of the acceleration time information 132 will be described.

[Specific Example of Acceleration Time Information]

FIG. 18 is a view illustrating the specific example of the acceleration time information 132. The acceleration time information 132 illustrated in FIG. 18 has, as an item, "ACCELERATION TIME" in which the total of the amount of time by which the current time is put forward by the acceleration of processing is set.

Specifically, in the acceleration time information 132 illustrated in FIG. 18, "20:30:00" is set as "ACCELERATION TIME". That is, the acceleration time information 132 illustrated in FIG. 18 indicates that the amount of time by which the current time is put forward by the acceleration of processing is 20 hours 30 minutes.

[Job Scheduler Test Process of Acceleration Control Manager]

Next, the job scheduler test process in the acceleration control manager P6 of the information processing apparatus 1 will be described. The acceleration control manager P6 is the process that operates in the information processing apparatus 1 in response to, e.g., input of an acceleration control command by the business operator.

Figure 12:
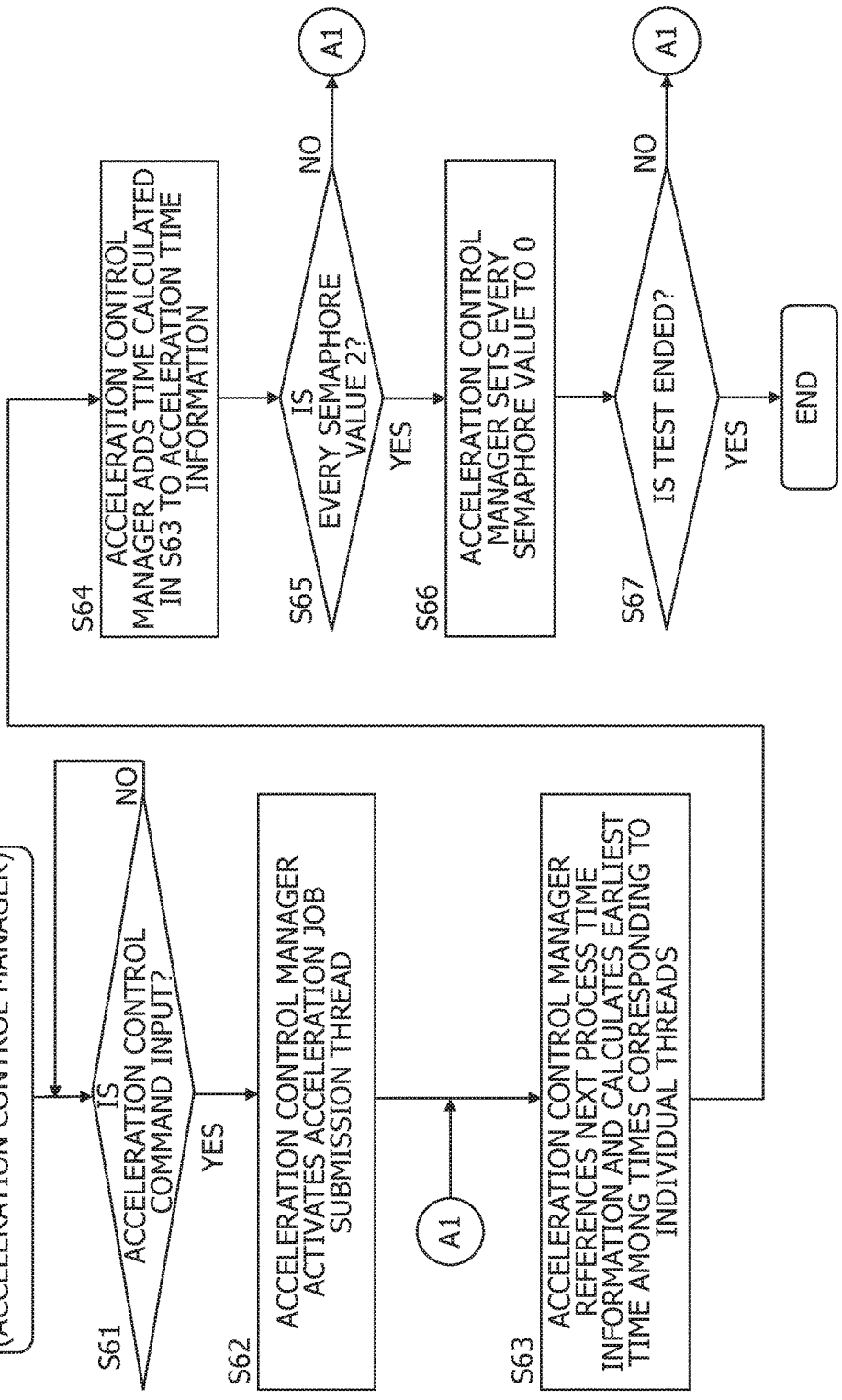
FIG. 12 is a flowchart illustrating details of the job scheduler test process in the first embodiment.

As illustrated in FIG. 12, the acceleration control manager P6 waits until a command for activating the acceleration control manager P6 (hereinafter also referred to as the acceleration control command) is input in the business operator terminal 11 (NO in S61). In the case where the acceleration control command is input (YES in S61), the acceleration control manager P6 activates the thread that controls the time of the submission timing of the job (hereinafter also referred to as an acceleration job submission thread) (S62). Hereinbelow, the job scheduler test process in the acceleration job submission thread will be described.

[Job Scheduler Test Process of Acceleration Job Submission Thread]

Figure 13:
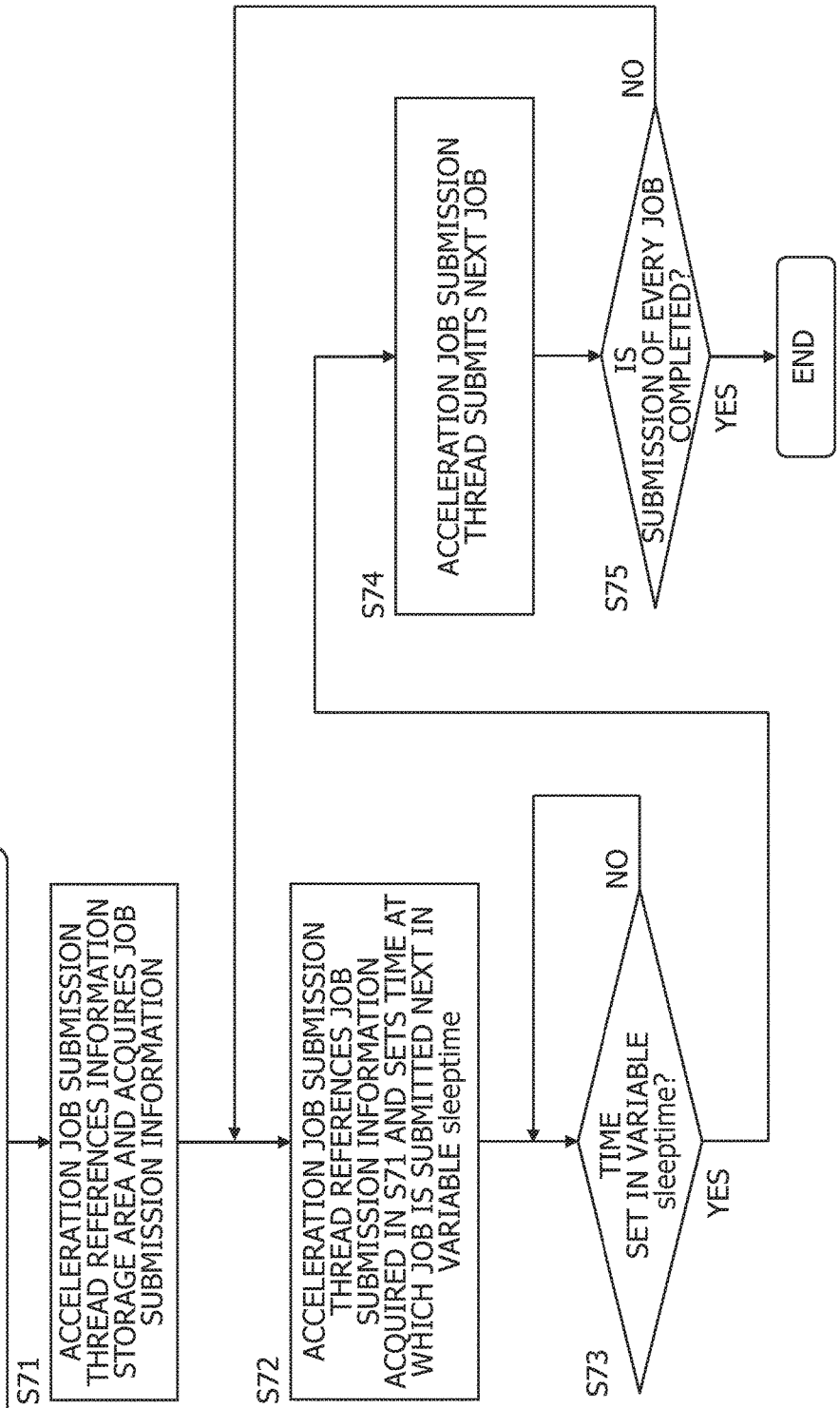
FIG. 13 is a flowchart illustrating details of the job scheduler test process in the first embodiment.

As illustrated in FIG. 13, after the acceleration job submission thread is activated by the acceleration control manager P6, the acceleration job submission thread references the information storage area 130, and acquires job submission information (not illustrated) (S71). The job submission information is information that includes identification information of the job that is submitted when the job scheduler test is performed and a submission time. The job submission information may also be pre-stored in the information storage area 130 by, e.g., the business operator.

Subsequently, the acceleration job submission thread references the job submission information acquired in the process in S71, and sets a time at which the job is submitted next in a variable sleeptime (S72). Thereafter, the acceleration submission thread waits until the time set in the variable sleeptime (NO in S73).

Thereafter, in the case where the time set in the variable sleeptime has come (YES in S73), the acceleration job submission thread submits the next job to the job manager P1 (S74). Subsequently, in the case where the submission of every job having information included in the job submission information is completed (YES in S75), the acceleration job submission thread ends the job scheduler test process in the acceleration job submission thread. On the other hand, in the case where the submission of every job having information included in the job submission information is not completed (NO in S75), the acceleration job submission thread performs the processes in and after S72 again.

Returning to FIG. 12, after the process in S62, the acceleration control manager P6 references the next process time information 131 to calculate the earliest time among times corresponding to the individual threads (S63). Subsequently, the acceleration control manager P6 adds the time calculated in S63 to the time indicated by the acceleration time information 132 stored in the information storage area 130 (S64).

Thereafter, in the case where every semaphore value is 2 (YES in S65), the acceleration control manager P6 sets every semaphore value to 0 (S66).

In this case, the acceleration control manager P6 references the process frequency information 133 a plurality of times at intervals and, in the case where the content included in the process frequency information 133 does not change, the acceleration control manager P6 may set every semaphore value to 0. That is, in the case where a state in which every semaphore value is 2 continues for a predetermined time period, the acceleration control manager P6 may set every semaphore value to 0. With this, it becomes possible for the acceleration control manager P6 to change the semaphore value only in the case where the state of every thread that operates in the information processing apparatus 1 is stably the standby state.

On the other hand, in the case where every semaphore value is not 2 (NO in S65), the acceleration control manager P6 performs the processes in and after S63 again.

In addition, in the case where information that the job scheduler test process is ended is input (YES in S67), the acceleration control manager P6 ends the job scheduler test process. In the case where the information that the job scheduler test process is ended is not input (NO in S67), the acceleration control manager P6 performs the processes in and after S63 again.

That is, in the case where the job scheduler test process is started, each semaphore value is set to 1 by an initialization process of the semaphore value (S51, S52). 1 is added to each semaphore value in response to the change of the state of the corresponding thread to the standby state (S104). As a result, it becomes possible for the acceleration control manager P6 to determine that a timing at which the time referenced by each thread is changed has come in the case where the semaphore value of every thread that operates in the information processing apparatus 1 becomes 2.

In the case where the change of the time referenced by each thread is already performed (YES in S53), each semaphore value is set to 2 in response to the execution of the process of changing the time referenced by each thread (S52, S54). Further, in the case where every thread that operates in the information processing apparatus 1 is in the standby state, each semaphore value is not changed from 2. Accordingly, in this case as well, it becomes possible for the acceleration control manager P6 to determine that the timing at which the time referenced by each thread is changed has come in the case where the semaphore value of every thread that operates in the information processing apparatus 1 becomes 2.

Consequently, in the case where every semaphore value is 2 in the process in S65, the acceleration control manager P6 determines that the timing at which the time referenced by each thread is to be changed has come.

Note that, in the case where the acceleration control manager P6 sets every semaphore value to 0 in the process in S66, the acceleration control manager P6 performs the setting to every semaphore value at the same time. With this, it becomes possible to prevent the state of the thread from being changed during the setting to the semaphore value.

[Specific Example of Job Scheduler Test Process]

Next, a specific example of the job scheduler test process will be described. After each acceleration control thread included in each process is activated by the process, the acceleration control thread sets the semaphore value corresponding to every thread included in the same process as that of the acceleration control thread to 1 (S51, S52). That is, as illustrated in FIG. 16, each acceleration control thread sets 1 as the semaphore value corresponding to every thread that operates in the information processing apparatus 1.

Thereafter, each thread that operates in the information processing apparatus 1 adds 1 to the semaphore value corresponding to the thread in response to the change of the state of the thread to the standby state. In addition, each thread that operates in the information processing apparatus 1 subtracts 1 from the semaphore value corresponding to the thread in response to the change of the state of the thread from the standby state to the execution state. Specifically, after the state illustrated in FIG. 16, in the case where every thread included in each of the job manager P1 and the job simulator P5 is brought into the standby state, as illustrated in FIG. 19, the acceleration control thread sets the semaphore values corresponding to "MANAGER (1)", "MANAGER (2)", "SIMULATOR (1)", and "SIMULATOR (2)" to 2.

Then, as illustrated in FIG. 20, in the case where the semaphore value corresponding to every thread is set to 2, as illustrated in FIG. 21, the acceleration control manager P6 sets the semaphore value corresponding to every thread to 0 (YES in S65, S66).

Subsequently, each acceleration control thread adds 1 to the semaphore value corresponding to each thread included in the same process as that of the acceleration control thread (S54). Specifically, in the process in S54, as illustrated in FIG. 22, the acceleration control thread included in the job manager P1 sets the semaphore values corresponding to "MANAGER (1)" and "MANAGER (2)" to 1.

Then, after the state illustrated in FIG. 22, in the case where the state of the thread corresponding to "MANAGER (1)" is changed from the standby state to the execution state, as illustrated in FIG. 23, the acceleration control thread sets the semaphore value corresponding to "MANAGER (1)" to 0.

Further, after the state illustrated in FIG. 23, in the case where the state of the thread corresponding to "MANAGER (1)" is changed from the execution state to the standby state, as illustrated in FIG. 24, the acceleration control thread included in the job manager P1 sets the semaphore value corresponding to "MANAGER (1)" to 1. In addition, after the state illustrated in FIG. 23, in the case where the state of the thread corresponding to "MANAGER (2)" is changed from the standby state to the execution state, as illustrated in FIG. 24, the acceleration control thread included in the job manager P1 sets the semaphore value corresponding to "MANAGER (2)" to 0.

Thereafter, in the case where the acceleration control thread included in the job manager P1 causes each thread included in the same process as that of the acceleration control thread to reference the changed time, as illustrated in FIG. 25, the acceleration control thread adds 1 to each of the semaphore values corresponding to "MANAGER (1)" and "MANAGER (2)" (S55, S52). Subsequently, after the state illustrated in FIG. 25, in the case where the state of the thread corresponding to "MANAGER (2)" is changed from the execution state to the standby state, as illustrated in FIG. 26, the acceleration control thread included in the job manager P1 sets the semaphore value corresponding to "MANAGER (2)" to 2.

Thus, the information processing apparatus 1 in the present embodiment determines whether or not the state of every thread of the test-target job scheduler P2 is the standby state. Subsequently, in the case where the state of every thread of the job scheduler P2 is the standby state, the information processing apparatus 1 changes the time of the system referenced when each thread executes the process to the time that is put forward.

With this, it becomes possible for the information processing apparatus 1 to efficiently perform the test of the job scheduler that uses the job simulator.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein instructions that when executed by a computer cause the computer to execute a process comprising:
   determining, for each thread of a plurality of threads of a job scheduler executing on a computation node, that a state of each thread is a standby state;
   storing a system time referenced by each thread;
   executing a simulation test for each thread on a management node;
   storing a length of time to execute the respective simulation test for each thread;
   adding the respective length of time of each executed simulation test to the system time referenced by each thread resulting in a respective acceleration time for each thread;
   changing the state of each thread from the standby state to an execution state; and
   executing each thread on the computation node based on the respective acceleration time.

2. The non-transitory computer-readable storage medium according to claim 1, wherein the process further comprises:
   storing first information indicating that the state of each thread of the job scheduler is the standby state in a storage in a case when each thread is brought into the standby state; and
   storing second information indicating that the state of each thread of the job scheduler is the execution state in the storage in a case when each thread is brought into the execution state, wherein the determining includes determining that the state of each thread is the standby state by referring to the storage.

3. The non-transitory computer-readable storage medium according to claim 1, wherein the process further comprises:
   storing, by each thread of the job scheduler in the standby state, a time at which each thread is brought into the execution state in a storage; and
   changing the system time to an earliest time among the times at which each thread is brought into the execution state by referring to the storage.

4. The non-transitory computer-readable storage medium according to claim 1, wherein the determining includes determining that the state of each thread is the standby state for a predetermined time period.

5. A job scheduler test method comprising:
   determining, by at least one processor, for each thread of a plurality of threads of a job scheduler executing on a computation node, that a state of each thread is a standby state;
   storing a system time referenced by each thread;
   executing a simulation test for each thread on a management node;
   storing a length of time to execute the respective simulation test for each thread;
   adding the respective length of time of each executed simulation test to the system time referenced by each thread resulting in a respective acceleration time for each thread;
   changing the state of each thread from the standby state to an execution state; and
   executing each thread on the computation node based on the respective acceleration time.

6. The job scheduler test method according to claim 5, wherein the method further comprises:
   storing first information indicating that the state of each thread of the job scheduler is the standby state in a storage in a case when each thread is brought into the standby state; and
   storing second information indicating that the state of each thread of the job scheduler is the execution state in the storage in a case when each thread is brought into the execution state, wherein the determining includes determining that the state of each thread is the standby state by referring to the storage.

7. The job scheduler test method according to claim 5, wherein the method further comprises:
   storing, by each thread of the job scheduler in the standby state, a time at which each thread is brought into the execution state in a storage; and
   changing the system time to an earliest time among the times at which each thread is brought into the execution state by referring to the storage.

8. An information processing apparatus comprising:
   a memory; and
   a processor coupled to the memory and the processor configured to:
     determine, for each thread of a plurality of threads of a job scheduler executing on a computation node, that a state of each thread is a standby state;
     store a system time referenced by each thread in the memory;
     execute a simulation test for each thread on a management node;
     store a length of time to execute the respective simulation test for each thread in the memory;
     add the respective length of time of each executed simulation test to the system time referenced by each thread to result in a respective acceleration time for each thread;
     change the state of each thread from the standby state to an execution state; and
     execute each thread on the computation node based on the respective acceleration time.

9. The information processing apparatus according to claim 8, wherein the processor is further configured to:
   store first information indicating that the state of each thread of the job scheduler is the standby state in the memory in a case when each thread is brought into the standby state; and
   store second information indicating that the state of each thread of the job scheduler is the execution state in the memory in a case when each thread is brought into the execution state, wherein the processor determines that the state of each thread is the standby state by referring to the storage memory.

10. The information processing apparatus according to claim 8, wherein the processor is further configured to:
    store, by each thread of the job scheduler in the standby state, a time at which each thread is brought into the execution state in the memory; and
    change the system time to an earliest time among the times at which each thread is brought into the execution state by referring to the memory.

* * * * *